Sept. 8, 1959 K. D. NICHOLS 2,902,838
AUTOMOBILE REFRIGERATING APPARATUS
Filed July 19, 1956 2 Sheets-Sheet 1

INVENTOR.
Kermit D. Nichols
BY
His Attorney

Sept. 8, 1959 K. D. NICHOLS 2,902,838
AUTOMOBILE REFRIGERATING APPARATUS
Filed July 19, 1956 2 Sheets-Sheet 2
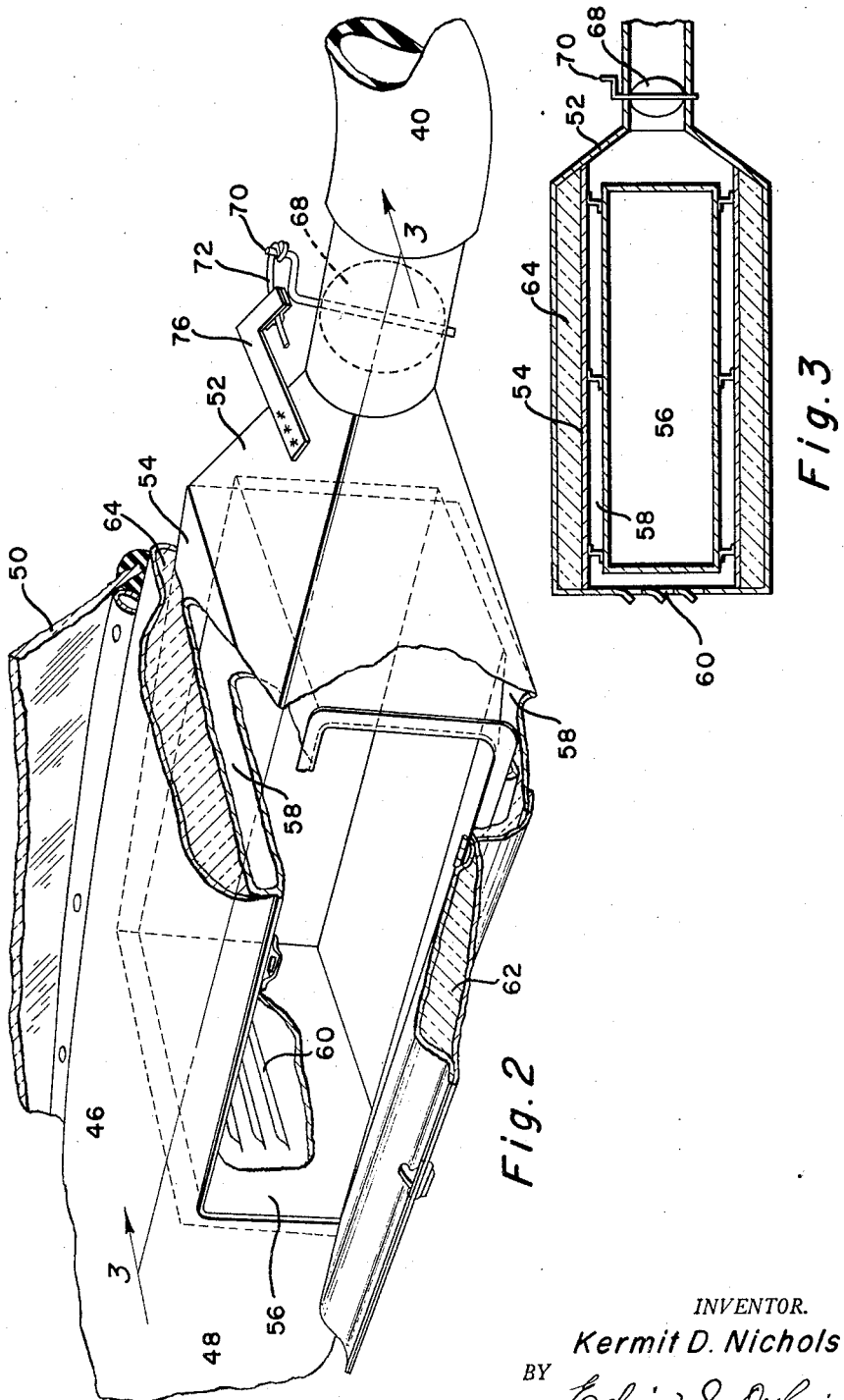
INVENTOR.
Kermit D. Nichols
BY
His Attorney United States Patent Office 2,902,838
Patented Sept. 8, 1959

2,902,838

AUTOMOBILE REFRIGERATING APPARATUS

Kermit D. Nichols, Miamisburg, Ohio, assignor to General Motors Corporation, Detroit, Mich., a corporation of Delaware Application July 19, 1956, Serial No. 598,825

4 Claims. (Cl. 62—244)

This invention relates to refrigerating apparatus and more particularly to means for air conditioning automobiles and providing a refrigerated storage compartment beneath the cowl.

It is an object of this invention to provide a simple, inexpensive combined means for refrigerating a storage compartment and cooling the passenger compartment of an automobile.

It is another object of this invention to divert some of the air cooled by an automobile air cooling system around a storage compartment to keep the compartment refrigerated.

These and other objects are attained in the form shown in the drawings in which an air cooling means is provided in the engine compartment and has two air delivering ducts extending through the fire wall. Beneath the cowl there is provided a compartment similar to a glove compartment but which is enclosed by a fluid passageway which receives the air from one of the ducts. The air after passing through these passageways is discharged into the passenger compartment to provide cooling. The second duct delivers into an air discharge means delivering air into the passenger compartment for providing a cool atmosphere.

Further objects and advantages of the present invention will be apparent from the following description, reference being had to the accompanying drawings, wherein a preferred form of the present invention is clearly shown.

In the drawings:

Figure 2 is a perspective view of the refrigerated storage compartment; and

Figure 3 is a sectional view taken along the line 3—3 of Figure 2.

Figure 1:
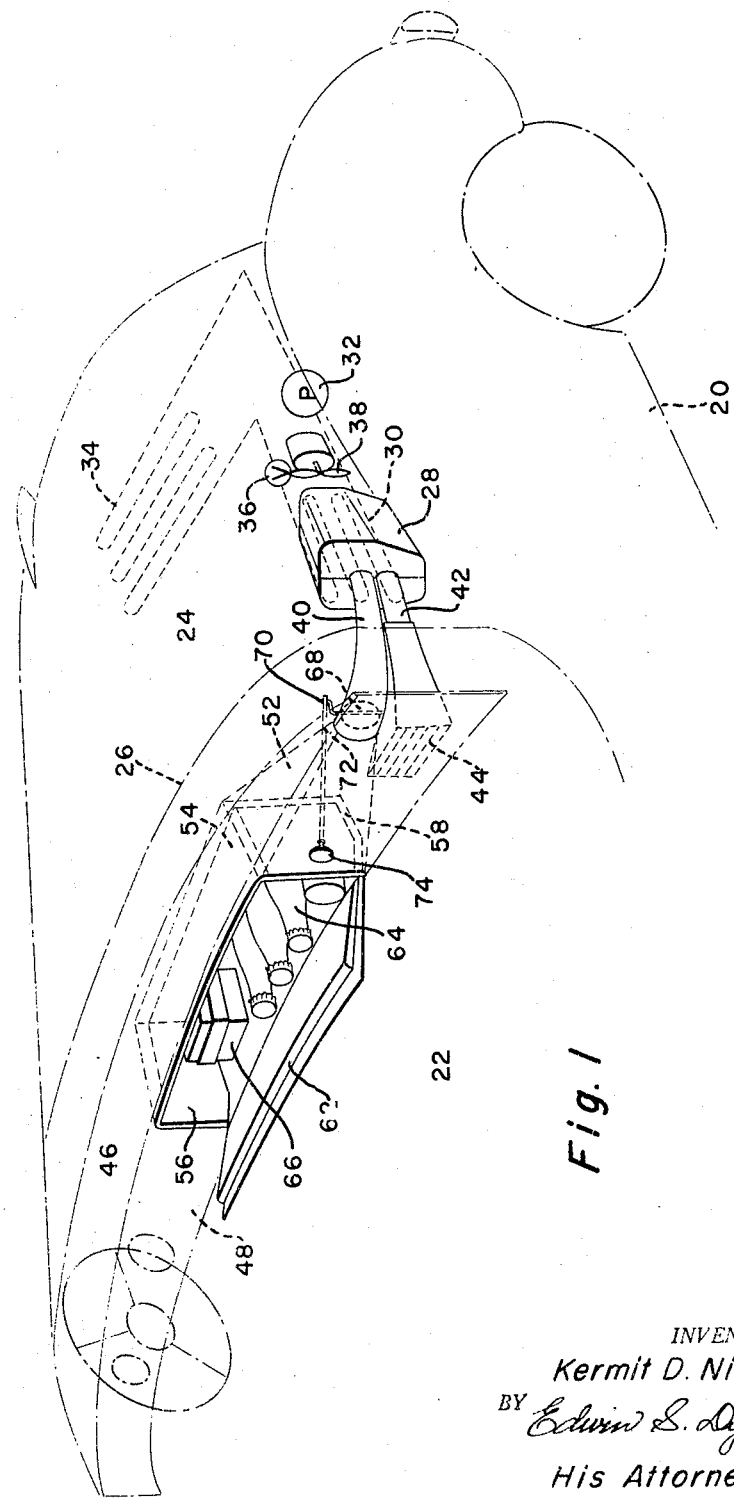
Figure 1 is a schematic view showing a passenger automobile embodying one form of my invention.

Referring now to the drawings and more particularly to Figure 1, there is shown a passenger automobile 20 having a passenger compartment 22 and an engine compartment 24 separated by a fire wall 26. In the engine compartment 24 there is provided an air cooling means 28 including an evaporator 30 which is connected to the suction entrance of a compressor 32. The compressor 32 delivers compressed refrigerant to the air cooled condenser 34 preferably located in front of the radiator of the automobile engine. The condenser delivers liquid refrigerant to a suitable valve or restrictor 36 which controls the flow of liquid refrigerant to the evaporator 30.

The air cooling means 28 receives outside air from the fan 38 which moves the air into heat transfer relationship with the evaporator 30 so that it is cooled and delivered into the discharge ducts 40 and 42. These discharge ducts 40 and 42 extend through the fire wall 26. The duct 42 delivers air to the air discharge means 44 located beneath the cowl 46 and the windshield 50 of the passenger compartment 22. The duct 40 delivers air to a shroud 52 which extends to form a box-shaped sheet metal enclosure 54 around a box-shaped metal casing 56 which is in the shape of a glove compartment of an automobile. Between the casing 56 and the enclosure 52 are air cooling passages 58. Upon the opposite side from the shroud 52 the enclosure 54 is provided with discharge louvers 60. The casing 56 is provided with an insulated door 62 in the dash 48 which is pivoted similar to a glove compartment door. The enclosure 54 is also surrounded by the heat insulation 64 to prevent condensation on its outer surfaces. The air flowing through the passages surrounding the casing 56 is sufficiently cold to keep cool bottles of beverages 64 and packages 66 therein as shown in Figure 1.

The proportion of air discharged from the air discharge means 44 and the proportion flowing around the casing 56 and discharged from the louvers 60 is controlled by a butterfly damper 68 having an operating crank 70 connected by a Bowden wire 72 to a knob 74 on the dash 48.

The Bowden wire 72 adjacent the crank 70 is supported by an angle bracket 76 provided with a clamp for clamping the sheath of the Bowden wire. Through this arrangement, when no refrigeration is desired for the compartment 56, the damper 68 may be closed by the knob 74.

The combined construction and arrangement is comparatively inexpensive and the refrigeration of the compartment 56 also serves to cool the passenger compartment 22. The compartment is quite useful in preserving lunches, beverages and meals for picnics.

While the form of embodiment of the invention as herein disclosed constitutes a preferred form, it is to be understood that other forms might be adopted, as may come within the scope of the claims which follow.

What is claimed is as follows:

1. An automobile including a body provided with a cowl and a passenger space, a casing beneath the cowl provided with a door forming a compartment accessible to passengers, air cooling means, a second enclosure surrounding a major portion of said casing providing a fluid passageway between the casing and the enclosure, and means for conducting air first into heat exchange relation with said air cooling means and thereafter through said fluid passageway to keep cool said compartment and finally discharging the air beneath the cowl into the interior of the body, and damper means for controlling the flow of air through said fluid passageway, said means for conducting air also including a second passageway extending from said cooling means to said passenger space by-passing said casing and said second enclosure.

2. An automobile including a body provided with a cowl, a casing beneath the cowl provided with a door forming a compartment accessible to passengers, air cooling means, said body having passenger and engine compartments and a fire wall separating the engine compartment from the passenger compartment, said air cooling means being located in the engine compartment, a second enclosure beneath said cowl within the passenger compartment surrounding a major portion of said casing providing a fluid passageway between the casing and the enclosure, duct means extending from the air cooling means through the fire wall to said enclosure and passageway for delivering air cooled by the cooling means to said passageway for keeping cool the interior of said casing.

3. An automobile including a body provided with a cowl, a casing beneath the cowl provided with a door forming a compartment accessible to passengers, air cooling means, said body having passenger and engine compartments and a fire wall separating the engine compartment from the passenger compartment, said air cooling means being located in the engine compartment, a second enclosure beneath said cowl within the passenger compartment surrounding a major portion of said casing providing a fluid passageway between the casing and the enclosure, duct means extending from the air cooling means through the fire wall to said enclosure and passageway for delivering air cooled by the cooling means to said passageway for keeping cool the interior of said casing, an air discharge device in said passenger compartment, and a second duct means extending from said air cooling means to said air discharge device.

4. An automobile including a body provided with a cowl, a casing beneath the cowl provided with a door forming a compartment accessible to passengers, air cooling means, said body having passenger and engine compartments and a fire wall separating the engine compartment from the passenger compartment, said air cooling means being located in the engine compartment, a second enclosure beneath said cowl within the passenger compartment surrounding a major portion of said casing providing a fluid passageway between the casing and the enclosure, duct means extending from the air cooling means through the fire wall to said enclosure and passageway for delivering air cooled by the cooling means to said passageway for keeping cool the interior of said casing, said second enclosure having an air discharge device for discharging cooled air into said passenger compartment.

References Cited in the file of this patent

UNITED STATES PATENTS

| | | |
|---|---|---|
| 1,294,096 | Hall | Feb. 11, 1919 |
| 2,144,690 | Rogers | Jan. 24, 1939 |
| 2,169,664 | Shifflett | Aug. 15, 1939 |
| 2,285,945 | Rundell | June 9, 1942 |
| 2,475,897 | Iwanski | July 12, 1949 |
| 2,512,077 | Walker | June 20, 1950 |
| 2,752,842 | Sumner | July 3, 1956 |
| 2,780,073 | Curry | Feb. 5, 1957 |